May 5, 1953          R. B. MATTHEWS          2,637,343
GAS VALVE AND ELECTROMAGNETIC CONTROL THEREFOR
Filed Oct. 17, 1949          2 SHEETS—SHEET 1
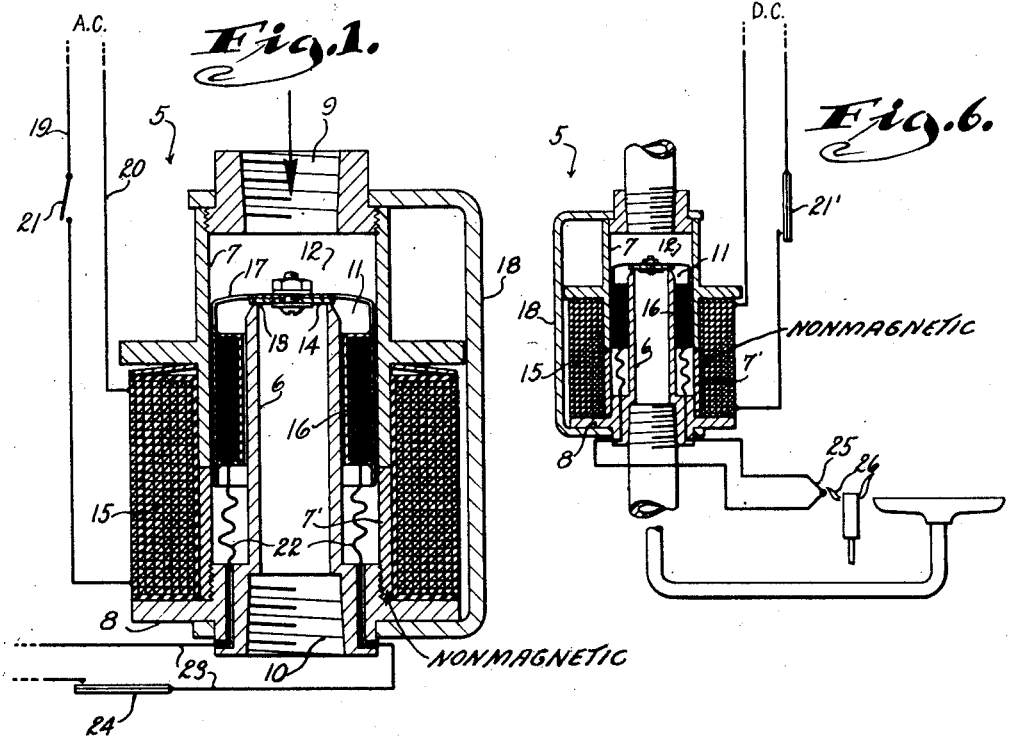
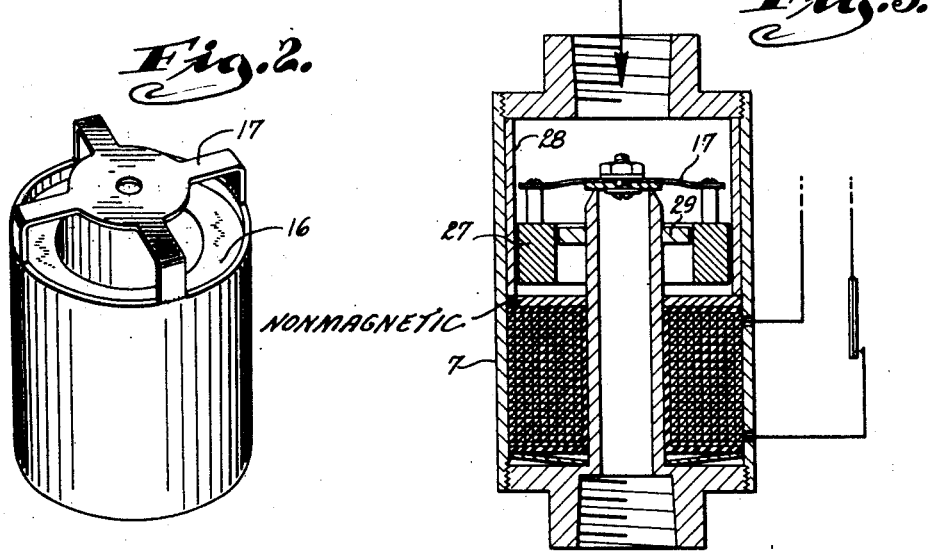
Inventor
Russell B. Matthews
By Ira Milton Jones
Attorney Inventor
Russell B. Matthews

Patented May 5, 1953

2,637,343

UNITED STATES PATENT OFFICE

2,637,343

GAS VALVE AND ELECTROMAGNETIC CONTROL THEREFOR

Russell B. Matthews, Wauwatosa, Wis., assignor to Milwaukee Gas Specialty Company, Milwaukee, Wis., a corporation of Wisconsin Application October 17, 1949, Serial No. 121,817

21 Claims. (Cl. 137—692)

This invention relates to electro-magnetically operated gas valves and similar control apparatus.

In the copending application of Russell B. Matthews, Serial No. 111,621 filed August 22, 1949 a specific adaptation of this invention is illustrated and claimed.

The underlying concept of the instant invention, as in the said copending application, turns upon the use of two cooperating relatively movable solenoids, or more specifically a fixed and a movable solenoid, so disposed with respect to each other and so related to each other that the work performed by the device is the result of mutual repulsion between the solenoids as distinguished from the attraction of an armature towards a pole piece. Such mutual repulsion between the solenoids has the advantage of affording maximum tractive force at the time when it is most needed, that is, at the start of the operating stroke. This is particularly advantageous in the control of valves where the initial opening entails considerably more force than the subsequent lifting of the valve once the valve has been "cracked."

It is recognized that this broad principle is not new, having been disclosed in Patent No. 1,672,193 issued to D. F. Bason, June 5, 1928. However, as far as known, no application of this principle in the prior art has been satisfactory for use in gas controls such as those employed on gas fired furnaces, hot water heaters and the like. No doubt the reason for this lies in the fact that the small space available for the control valves on such equipment has placed a premium upon large capacity per unit of size.

It is, therefore, one of the chief objects of this invention to provide an improved solenoid type gas valve in which the desired high capacity is obtained by having the valve and control therefor so arranged as to permit straight through flow.

With a view toward achieving simplicity it is another object of this invention to provide a valve and control therefor wherein the valve is held closed by gravity and fluid pressure acting thereon, and is opened by upward movement of a movable solenoid in response to mutual repulsion between it and a fixed magnetic field producing means.

In this connection it is another object of this invention to so connect the movable solenoid with the valve it controls that the solenoid is levitated to thereby assure more rapid response thereof during operation of the control.

Another and very important object of this invention, namely to provide a valve of the character described which is more silent in operation especially upon opening, follows from the particular manner in which the response of the movable solenoid operates to open the valve.

Another object of this invention is to provide a control for gas valves and the like which inherently provides a source of low voltage current for the control circuit by which the response of the device may be governed.

Another object of this invention is to provide a control device of the character described which lends itself readily to the incorporation of such safety features as pilot light control, that is, shut down of the apparatus in the event of extinction of the pilot flame.

In this connection it is an especially important object of this invention to provide a gas valve of the character described which is inherently safe lighting.

Still another object of this invention is to provide a control of the character described especially well adapted for use as a remote control device for governing the operation of diaphragm actuated valves and similar devices.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a longitudinal sectional view through a valve and control therefor embodying one form of this invention especially adapted to control the flow of gas to a burner at the dictation of a temperature responsive thermostat;

Figure 2 is a perspective view of the movable solenoid and its connection to the valve as employed in the construction shown in Figure 1;

Figure 3 is a longitudinal sectional view through a modified adaptation of the valve and control therefor and which distinguishes from Figure 1 principally in the specific construction of the movable solenoid and placement of the fixed or stationary solenoid;

Figure 4 is a view similar to Figure 1 but illustrating the application of this invention to the remote control of a diaphragm actuated valve or the like;

Figure 6 is a view similar to Figure 1 but illustrating the manner of rendering the operation of the device dependent upon the maintenance of a pilot flame.

Figure 4:
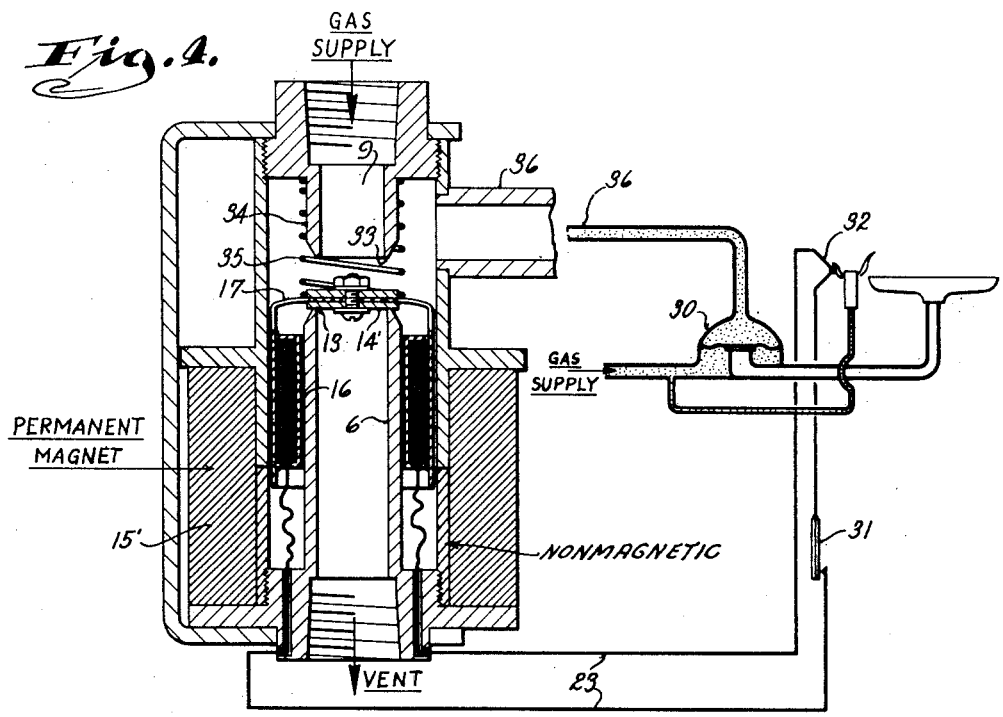

Referring now particularly to the accompanying drawings and especially to Figures 1 and 6 in which the valve unit is physically the same, the numeral 5 designates generally the body of the valve and which comprises coaxial inner and outer ducts 6 and 7 respectively, connected together at the bottom by a flange 8 on the inner duct. The ducts 6 and 7 together provide a passage leading from an inlet 9 at the top of the unit to an outlet 10 at the bottom thereof; the inlet and outlet being provided with pipe taps to enable the valve body to be connected in a pipe line through which the flow of gas or other fluid is to be controlled.

It is to be observed that the inner duct 6 is substantially shorter than the outer duct and that it is also smaller in diameter so as to leave an annular space 11 between the two ducts extending for substantially the full height of the duct and a chamber 12 above the top of the inner duct.

The top of the inner duct is formed to provide a valve seat 13 with which a valve 14 coacts to close off flow through the passage. In use the valve is mounted in the upright position shown in Figures 1 and 6 so that gravity and the fluid pressure at the inlet holds the valve 14 seated. The valve is opened by mutual repulsion between a fixed solenoid 15 and a movable solenoid 16, the latter being axially movable in the annular space 11 and mechanically connected to the valve 14.

The mechanical connection between the valve 14 and the movable solenoid 16 is resiliently yieldable so as to levitate the solenoid. Thus, as best shown in Figure 2 the movable solenoid 16 which is essentially a suitably encased winding or coil has a resiliently yieldable spider 17 mounted on the upper end thereof and the valve 14 is secured to the underside of the hub of this spider. The resilient yieldability of the arms of the spider levitates the movable solenoid 16 so that during its response to mutual repulsion between the solenoids only the inertia of the solenoid itself need be initially overcome. In other words, before any valve lifting effort is exerted the inertia of the movable solenoid has been overcome and momentum thereof has been established.

It is, of course, understood that the inner and outer ducts coact to constrain the movable solenoid and consequently the valve to axial up and down motion and that the chamber 12 is large enough to allow the valve 14 to be lifted a substantial distance off its seat. The extent to which the valve is so lifted depends upon the strength of the electromagnetic force effecting the mutual repulsion between the two solenoids.

To assure the desired mutual repulsion between the solenoids a definite magnetic circuit must be defined. To this end the entire inner duct 6 and its flange 8 are formed of magnetic metal and the upper portion of the duct 7 is likewise formed of magnetic metal. The lower portion 7', therefore, by which the outer duct is connected to the inner duct, is of non-magnetic metal. The magnetic circuit is completed by a frame 18 of magnetic metal engaging the inlet and outlet ends of the valve body and by which the valve body is embraced and supported for attachment to a suitable support, it being understood that the coil or winding which comprises the fixed solenoid 15 is wound upon a spool of non-metallic material and held in place in any suitable manner.

Where the device is intended for energization from alternating current as shown in Figure 1 the fixed solenoid is connected to a source of alternating current through lines 19 and 20 which may be considered a primary circuit, and one of which has a cut-out switch 21 connected therein.

The coil or winding which comprises the movable solenoid 16 is connected through flexible leads 22 with lines 23 which form a secondary circuit and which is adapted to be closed by a thermostatically responsive switch 24 responsive to room temperature or the like.

Assuming that the secondary circuit for the movable solenoid 16 is completed as by closure of the thermostatic switch 24, the energization of the fixed solenoid 15 by alternating current causes an alternating current to be induced in the movable solenoid 16. This results from the fact that the movable solenoid 16 is disposed in the radial air gap between the upper or free end of the inner duct 6 and the portion of the outer duct 7 surrounding the movable solenoid and which comprise portions of the magnetic circuit around the fixed solenoid 15. Accordingly, the flux generated by the fixed solenoid 15 is concentrated across this radial air gap and the movable solenoid is magnetically interlinked with the fixed solenoid so that an alternating E. M. F. is induced in the movable solenoid by transformer action. Although the alternating current flowing in the movable solenoid is out of phase with applied E. M. F. it is nevertheless in the same direction as the applied E. M. F. Hence, at any one instant, as when the magnetic flux travels across the radial air gap from the inner duct 6 to the outer duct 7 the flux field generated by the movable solenoid in consequence to current flow therein in the same direction as in the fixed solenoid 15 travels toroidally about the movable solenoid down its interior and upwardly across its exterior, and consequently radially inwardly adjacent to the upper portion of the movable solenoid and counter to the air gap flux field thereat, and radially outwardly at the bottom portion of the movable solenoid in the direction of the air gap field adjacent thereto. This has the effect of diminishing or weakening the field above the movable solenoid while reinforcing the field beneath it to make it considerably stronger than that at its upper portion. Since the resulting force on the movable solenoid is in the direction from the stronger field to the weaker field, the movable solenoid is repelled with substantial force upwardly, toward a raised position outside the influence of the air gap field. As the movable solenoid is repelled upwardly, however, the repelling force diminishes until it is just sufficient to balance the weight of the movable solenoid, and equilibrium results at a raised position of the movable solenoid sufficiently high to effect proper opening of the valve.

Obviously, when the polarity of the solenoid is reversed, the field across the air gap is radially inwardly from the outer duct 7 to the inner duct 6, and the flux field generated by the movable solenoid in consequence to the current induced therein is a toroidal one extending downwardly around the exterior of the movable solenoid and upwardly through its interior, so that the direction of the field generated by the movable solenoid will again be counter to the direction of the air gap field adjacent to the upper portion of the movable solenoid and in the same direction as the air gap field at the bottom portion of the movable solenoid, to thus create the stronger magnetic field adjacent to the bottom portion of the movable solenoid and the upward repulsion of the latter toward the position of equilibrium.

It is desired to point out that the radial air gap in the magnetic circuit for the fixed solenoid 15 is provided by the overlapping portions of the inner and outer ducts 6 and 7, and that the field of the fixed solenoid is concentrated across this radial air gap. It is also highly important to note that the inner duct 6 in effect provides the core for the magnetically permeable frame surrounding the fixed solenoid 15 and in addition constrains the fluid entering the valve to flow axially through the movable solenoid 16.

Obviously the operativeness of the device, that is its ability to open the valve 14, requires closure of the main cut-out switch 21 as well as closure of the thermostatic switch 24.

Attention is directed to the fact that in this embodiment of the invention the transformer action which obtains between the two solenoids provides a source of low voltage current for the secondary control circuit. This is particularly advantageous since in most electric controls of this character it is desirable to have the control element such as the thermostatic switch 24 operate on low voltage which normally must be provided by a separate transformer.

In the adaptation of the invention shown in Figure 6 direct current is employed and since, of course, there is no transformer action and no induction of voltage in the movable solenoid if the fixed solenoid is energized by direct current, other means must be provided for energizing the movable solenoid. This may be done by proper connections between the windings which constitute the fixed and movable solenoids either with the same D. C. source or with a separate source of D. C. for the movable solenoid. A separate source is conveniently provided by a thermoelectric generator 25 such as a thermo-couple which, as is well known, generates E. M. F. upon being subjected to heat.

Thus, with the generator 25 in juxtaposition to the pilot flame 26 of the burner being controlled, the necessary E. M. F. for energization of the movable solenoid is obtained as long as the pilot flame burns. This adaptation of the invention is, therefore, especially suitable for use in the control of gas fired hot water heaters and the like since the opening of the valve can be automatically controlled by having the switch 21' thermostatically responsive to the temperature of the water and at the same time the desired safety is obtained by virtue of the generator 25 being dependent upon continuance of the pilot flame 26.

As illustrated in the modification shown in Figure 3 and where the device is to be operated by alternating current the movable solenoid or secondary may be simply a ring 27 of copper, aluminum or other metal having high electrical conductivity. In this case the ring 27 in effect constitutes one short circuited turn or loop in which an E. M. F. is induced in the same way as described in connection with Figure 1.

The structural details of the embodiment shown in Figure 3 apart from the movable solenoid are substantially like those described in Figures 1 and 6. The movable solenoid 27 is also levitated by the resiliently yieldable spider 17 to which the valve is secured, and the general organization of the parts is substantially as already described.

In this case, however, the outer duct 7 encloses the fixed solenoid so that the frame 18 is not needed to complete the magnetic circuit. The only other major distinction lies in the fact that the movable solenoid does not telescope within the fixed solenoid but moves axially toward and from the upper end thereof, guidance for such motion being provided by the outer duct 7, or more specifically a sleeve 28 in the upper end of the outer duct. This sleeve 28 is in effect a part of the outer duct serving merely as a spacer to hold the fixed solenoid in place.

A flange 29 of magnetic metal secured to the upper end of the inner duct and positioned to be opposite the upper end portion of the movable solenoid when the valve is closed concentrates the flux in such a manner as to assure more positive response of the movable solenoid upon alternating current energization of the fixed solenoid.

Figure 5:
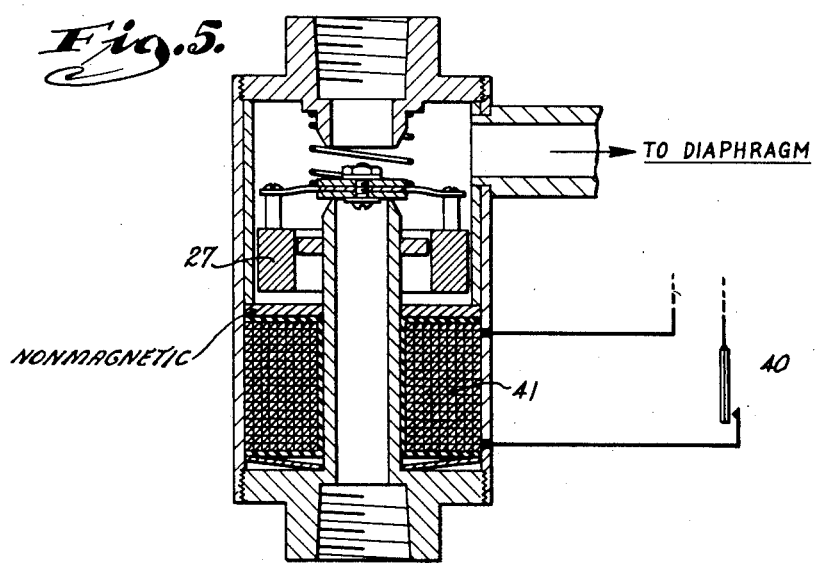
Figure 5 is a view similar to Figure 4 but in which the cooperating movable and fixed solenoids are of different construction and arrangement.

The embodiments of the invention shown in Figures 4 and 5 adapt the invention to remote control of such apparatus as a diaphragm actuated main gas valve, thus giving the apparatus the function of a relay. An outstanding characteristic of this adaptation of the invention is that the valve portion thereof has a two-way action.

As to the arrangement of the magnetic circuit and the inner and outer ducts, the construction of Figure 4 is very much like that of Figure 1. Also the movable solenoid 16 is of the same type and the resilient levitating connection 17 between the movable solenoid and the valve is the same.

Attention is directed to the fact, however, that the fixed magnetic field producing means 15' is a permanent magnet instead of a coil to be energized. The response of the movable solenoid 16 thus is dependent solely upon whatever control is incorporated in the secondary circuit 23 and since in this case the device is intended to govern the operation of a main diaphragm valve 30 in accordance with temperature changes in a room or other space being heated, the secondary circuit includes a thermostatic switch 31 and a thermoelectric generator 32 mounted in juxtaposition to the pilot flame of the burner to provide a safety feature.

To enable the apparatus to control the main diaphragm valve 30 the valve 14' has two positions, in one of which it has sealing engagement with the valve seat 13 and in the other of which it engages a seat 33 spaced upwardly of and coaxial with the seat 13 and formed on a downward extension 34 of the fitting providing the inlet 9. A spring 35 normally holds the valve 14' in engagement with the seat 13 thereby obviating the need for mounting the unit in its upright position shown. It is to be appreciated, however, that by virtue of the incorporation of the spring 35 some of the advantages of the previously described constructions are sacrificed as, for instance, the easy response of the apparatus to slight energizing current.

A branch 36 leads from the upper portion of the outer duct to the top of the diaphragm chamber of the main valve unit 30. Thus as long as the branch 36 is open to the gas source through the inlet 9, the pressures at opposite sides of the diaphragm are balanced and the valve 39 is closed. When the temperature in the room or space being heated drops below the critical value for which the thermostat 31 is set, this switch closes to thus effect energization of the movable solenoid 16 which then instantly lifts the valve 14' to its raised position engaging the seat 33 and shutting off gas flow to the top of the diaphragm chamber. Simultaneously therewith the upper diaphragm chamber is vented through the branch 36 and the inner duct 6 which, as indicated, leads to a suitable vent, and the resulting unbalanced pressures at opposite sides of the diaphragm effects the opening of the main valve controlled thereby.

The use of the permanent magnet 15' makes this a highly efficient valve. For instance, to operate a ½ inch valve having a capacity of 120,000 B. t. u. only 1.5 watts are required whereas the same valve operated by a conventional D. C. solenoid requires approximately 10 watts. This advantage is particularly important in the relay-like arrangement shown in Figure 4 since the size of the diaphragm valve used has no bearing upon the control valve. A very large main valve thus may be controlled with very little power.

In that form of the invention shown in Figure 5 the operation is the same as that just described but the structure differs to the extent that the fixed and movable solenoids are like those shown in Figure 3, the former being a coil connectable to a source of alternating current and the latter being a solid ring 27. In this structure a thermostat 40 may control the energization of the solenoid 41 in response to a controlled condition (such as temperature of a room heated by a burner controlled by a valve similar to valve 30 of Figure 4) by the control action of the valve shown in Figure 5 when connected in a fuel supply control system in the manner shown in Figure 4.

From the foregoing description taken in connection with the accompanying drawings, it will be readily apparent to those skilled in this art that this invention provides an electrical control apparatus and specifically an electromagnetically controlled valve suitable for control of gas flow which has many advantages over similar apparatus heretofore available.

What I claim as my invention is:

1. In a valve of the character described: a valve body; annular magnetic field producing means on the body fixed with respect thereto; an elongated magnetically permeable tube fixed in the body, said tube projecting axially into the annular magnetic field producing means to provide an inner flux path therefor and defining a fluid passageway in the valve body; magnetically permeable frame means on the body connected with the tube at one end thereof in magnetic flux conducting relation thereto, said frame means providing an outer flux path extending about the exterior of said annular field producing means; a magnetically permeable sleeve on the body connected with said frame means and spaced from but encircling a portion of said tube near the other end thereof with said space providing a radial air gap in the magnetic circuit thus provided around the fixed magnetic field producing means and through which all of its flux must pass; a repulsion solenoid in said air gap movable back and forth therein axially of said tube and biased toward a predetermined position in said gap, said solenoid being movable axially away from said predetermined position by repulsion in response to energization thereof by a current which produces a magnetic field thereabout acting in opposition to the field across a portion of said air gap; means in the valve body adjacent to one end of said tube for closing off fluid flow through the passageway provided by the tube, including a valve seat and a valve cooperable therewith; and means connecting the repulsion solenoid with said valve so that movement of the solenoid effects actuation of the valve.

2. In a valve of the character described: a valve body; annular magnetic field producing means on the body fixed with respect thereto; an elongated magnetically permeable tube fixed in the body and projecting axially into said magnetic field producing means, said tube defining an inner passageway in the valve body; a magnetically permeable flange encircling said tube near one end thereof and in magnetic flux conducting relation thereto; magnetically permeable means including said flange and tube providing a substantially toroidal magnetic flux path around said annular field producing means, said magnetically permeable means including a sleeve spaced from but encircling a portion of said tube which is located a distance from said flange greater than the space between the walls of the sleeve and tube so that said space provides a radial air gap in the magnetic circuit around said field producing means; a repulsion solenoid in said air gap movable axially of said tube away from the flange thereon in response to energization by a current producing a magnetic field about the solenoid which acts in opposition to that of the field producing means; means in the valve body adjacent to one end of said tube for closing off fluid flow through the inner passageway provided by the tube, including a valve seat and a valve cooperable therewith; and a motion transmitting connection between the valve and said movable solenoid whereby the valve is operated thereby.

3. The valve set forth in claim 1 wherein said valve seat comprises an annular part on that end of the tube which is adjacent to the valve and forming a portion of said passageway in the valve body.

4. The valve set forth in claim 3 wherein said tube which provides the passageway in the valve body occupies an upright position and has the valve seat formed on its upper end so that the valve may rest thereon by gravity and be moved off of its seat by repulsion produced movement of the movable solenoid; and further characterized by the fact that the connection between the valve and the movable solenoid is resiliently yieldable so that the latter is levitated by the valve in the seated position thereof.

5. The valve set forth in claim 4 further characterized by the fact that the resiliently yieldable connection between the valve and the movable solenoid consists of a spider of thin resilient metal having the valve mounted on its hub and having the ends of its arms attached to the movable solenoid.

6. The valve set forth in claim 1 wherein said movable repulsion solenoid comprises a wound annular coil; and further characterized by the provision of electrical control means to which the ends of said coil are connected and by which the response of the movable solenoid may be controlled.

7. In a solenoid actuated valve: upright coaxial inner and outer magnetically permeable ducts connected together at the bottom with a fluid tight joint, the upper end of the inner duct terminating a distance short of the adjacent end of the outer duct and said ducts together comprising a passage through which fluid may flow, the upper portion of the inner duct being radially spaced from the portion of the outer duct surrounding the same; a valve seat at the upper end of the inner duct; a valve movable in the outer duct above said valve seat and resting by gravity thereon; a fixed solenoid encircling the inner duct and inside the outer duct; a movable solenoid inside the outer duct and encircling the upper portion of the inner duct remote from the connection between the ducts, and axially movable in the annular gap between the ducts, said ducts providing a substantially toroidal magnetic flux path around the fixed solenoid which path is closed except for said annular gap between the ducts in which the movable solenoid is disposed so that upon the establishment of out of phase E. M. F's. in the solenoids the movable solenoid is repulsed upwardly away from the connected ends of the ducts; means for establishing such out of phase E. M. F's. in the solenoids; and a connection between the movable solenoid and said valve through which the movement of said solenoid controls the position of the valve.

8. In a solenoid actuated valve of the character described: an elongated valve body having axially aligned inlet and outlet ports, and comprising a magnetically permeable inner duct leading from one of the said ports and terminating in a valve seat inside the body spaced from the other of said ports, an outer duct connected to the inner duct remote from said valve seat and having a magnetically permeable portion surrounding the end portion of the inner duct adjacent to the valve seat and coacting therewith to define an annular space encircling the inner duct which space provides a radial air gap between the ducts, said outer duct extending toward said other port to define a valve chamber adjacent to said valve seat, and said other duct having the other port therein so that communication from one port to the other is through the ducts and past the valve seat; a valve in the valve chamber engageable with the valve seat; fixed annular magnetic field producing means encircling the inner duct; a movable solenoid inside the outer duct and encircling the inner duct in said air gap, said solenoid being movable axially of the inner duct; magnetically permeable means including said inner duct and the magnetically permeable portion of the outer duct surrounding the movable solenoid providing a substantially toroidal flux path around the fixed magnetic field producing means closed except for said radial air gap in which the movable solenoid is disposed so that all of the flux must pass through said gap and so that energization of the movable solenoid by a current which produces a magnetic field thereabout acting in opposition to that of the fixed magnetic field producing means effects repulsion of the movable solenoid in one direction; and a mechanical connection between the movable solenoid and the valve whereby such repulsion of the solenoid imparts movement to the valve.

9. The valve set forth in claim 1 wherein said fixed magnetic field producing means comprises an annular permanent magnet.

10. Apparatus for controlling fluid flow, comprising: a valve body having a magnetically permeable duct fixed in its interior and defining a passageway in the valve body, one end of said duct terminating inside the valve body in spaced relation to the walls of the body; means inside the body for closing off fluid flow through said duct, including a movable valve element; a primary winding encircling said duct and fixed with respect to the valve body; a movable solenoid comprising a secondary winding encircling the duct adjacent to said end thereof and constrained to axial movement relative to the duct; magnetically permeable means including said duct providing a substantially toroidal flux path around the primary winding, said magnetically permeable means including portions fixed with respect to the body in radially spaced relation to said end portion of the duct and exteriorly adjacent to the movable solenoid with said space providing a radial air gap in the magnetic circuit around the primary winding, containing the movable solenoid, through which all of its flux must pass; means including conductors connectable with a source of current for energizing said primary winding; means including conductors connectable with a source of current for energizing the movable solenoid so that upon concomitant energization thereof with direct current transversing the solenoids in opposite directions, said solenoids are mutually repellent to effect movement of the movable solenoid in one direction; and a motion transmitting connection between the movable solenoid and said valve element whereby the valve element is operated by the movable solenoid.

11. A valve of the character described, comprising: a valve body having an inlet and an outlet; a magnetically permeable duct inside the body having one end thereof communicating with the outlet and its opposite end extending toward but terminating short of the inlet; means on said opposite end of the duct providing a valve seat; a valve in the valve body movable toward and from seating engagement with said valve seat; cooperating fixed and movable magnetic field producing means encircling said duct, the movable field producing means surrounding said other end portion of the duct adjacent to the valve seat thereon, and one of said field producing means comprising a wound coil; magnetically permeable means including said duct providing a substantially toroidal magnetic circuit around the fixed field producing means, said magnetically permeable means including a sleeve encircling the movable field producing means and consequently spaced from said other end of the duct with said space providing a radial air gap in the magnetic circuit through which all of the flux of the fixed field producing means must pass, whereby said two field producing means are mutually repellent upon electrical energization of the field producing means which comprises the winding to effect movement of the movable field producing means axially relative to said duct; means for energizing said winding; and a mechanical connection between the valve and the movable field producing means.

12. In combination: an elongated valve body having a pair of lengthwise spaced apart ports and a branch opening adjacent to one of said ports; a magnetically permeable duct inside the body in spaced relation to the body walls and communicable with said branch opening and having each of its ends leading to one of said ports; two opposed coaxial valve seats in the valve body, one on the end of the duct adjacent to said one port and the other valve seat being connected with said one port; a valve interposed between said seats and selectively engageable with either so that when the valve engages the seat connected with said one port the other port is connected with the branch opening and when the valve is engaged with the seat on the duct the branch opening is connected with said first designated port; cooperating fixed and movable magnetic field producing means encircling said duct, the movable field producing means being movable axially along a portion of the duct adjacent to the first designated end thereof, and one of said field producing means comprising a wound coil; a motion transmitting connection between said movable field producing means and the valve whereby the latter is moved back and forth into engagement with said opposed valve seats; magnetically permeable means providing a substantially toroidal magnetic circuit around the fixed field producing means and interlinked with the movable field producing means, said magnetically permeable means including a radial extension at said other end of the duct and a sleeve encircling the movable field producing means and consequently spaced from the portion of said duct encircled thereby with said space providing a radial air gap in the magnetic circuit around the fixed field producing means through which all of its magnetic flux must pass, said sleeve also having a portion extending axially beyond said one end of the duct and toward said first designated port to provide a part of the fluid passage through the valve body; and means for energizing said coil with a current which produces a magnetic field about the coil opposing that of the other magnetic field producing means so that said two magnetic field producing means are rendered mutually repellent to effect repulsion of the movable field producing means in a direction to carry the valve from engagement with one valve seat into engagement with the opposite valve seat.

13. The combination set forth in claim 12 wherein said fixed magnetic field producing means comprises a permanent magnet mounted on the valve body; and wherein said movable field producing means comprises the coil wound so that upon energization thereof with direct current it produces a magnetic field which opposes that of the permanent magnet to render the magnet and coil mutually repellent for actuation of the valve.

14. In a valve, the combination of: fixed annular magnetic field producing means; magnetically permeable frame means around said fixed field producing means having concentric radially spaced portions defining a radial air gap coaxially of said fixed field producing means and in which its field is concentrated; a solenoid disposed between said concentric portions of the frame means and constrained to endwise back and forth motion axially in the radial air gap provided thereby, said solenoid being biased in one direction toward a predetermined axial position in said air gap and being movable in the opposite direction by repulsion in response to energization thereof by a current which produces a magnetic field about the solenoid acting in opposition to the magnetic field across a portion of the air gap in which the solenoid is disposed; means including the inner of said concentric radially spaced portions of the magnetic frame means providing a fluid passageway in the valve leading axially through said solenoid; means in the valve for controlling the flow of fluid through said passageway including a valve element movable toward and from a position precluding fluid flow through said passageway; and means connecting the valve element with said solenoid so that back and forth movement of the solenoid effects actuation of the valve element.

15. In a valve, the combination of: fixed annular magnetic field producing means; magnetically permeable frame means around said fixed field producing means having concentric radially spaced portions defining a radial air gap coaxially of said fixed field producing means and in which its field is concentrated; a solenoid disposed between said concentric portions of the frame means and constrained to endwise back and forth motion axially in the radial air gap provided thereby, said solenoid being biased in one direction toward a predetermined axial position in said air gap and being movable in the opposite direction by repulsion in response to energization thereof by a current which produces a magnetic field about the solenoid acting in opposition to the magnetic field across a portion of the air gap in which the solenoid is disposed; means including said concentric portions of the frame means providing a fluid passageway a portion of which extends axially through said solenoid; means in the valve for controlling the flow of fluid through said passageway including a valve element movable toward and from a position precluding fluid flow through said passageway; and means connecting the valve element with said solenoid so that back and forth movement of the solenoid effects actuation of the valve element.

16. In a solenoid actuated valve of the character described: an elongated valve body having inlet and outlet ports which are lengthwise spaced from one another; an inner magnetically permeable tube in said valve body extending lengthwise between the ports and providing a passage in the valve body; primary magnetic field producing means encircling said tube; magnetically permeable means cooperating with said tube to define a toroidal flux path around said magnetic field producing means, said magnetically permeable means including portions radially opposite but spaced from the exterior of one end portion of the tube, and a radial connection between the other end of the tube and another portion of said permeable means, the toroidal flux path so defined including a radial air gap between said tube and portions of the magnetically permeable means at said one end of the tube; secondary magnetic field producing means endwise movably mounted in said air gap and encircling said tube; means for energizing one of said magnetic field producing means to create a field thereabout which will react with the magnetic field produced by the other field producing means to move the movable field producing means in one direction; means in the valve body adjacent to one end of said tube for closing off communication between one of said ports and the passageway provided by the tube, said means including a valve seat and a valve element movable toward and from said valve seat; and a connection between said valve element and said secondary field producing means whereby motion of the latter imparts motion to the valve element.

17. In a valve: spaced concentric inner and outer magnetically permeable tubular members defining a fluid passageway through the valve, said members being fixed with respect to one another, and the outer tubular member extending a distance beyond one end of the inner tubular member to define a valve chamber; a solenoid on the valve encircling the inner tubular member; a valve element in said valve chamber movable to and from a position closing off flow of fluid through said passageway; a substantially annular electromagnetically responsive member encircling said inner tubular member and inside said outer tubular member and movable in one axial direction in consequence of energization of said solenoid; and a motion transmitting connection between said electromagnetically responsive element and said valve element.

18. In a valve: means defining a passageway through the valve including spaced concentric inner and outer magnetically permeable tubular members fixed with respect to one another with the outer tubular member extending a distance beyond one end of the inner tubular member to define a valve chamber; a movable valve element in said chamber movable to and from a position closing off flow of fluid through said passageway; a pair of coacting annular magnetic field producing elements, each encircling the inner tubular member, one of said magnetic field producing elements being stationary and the other being axially movably located in the space between the inner and outer tubular members; one of said magnetic field producing elements being a solenoid and upon energization thereof effecting magnetic repulsion between the two field producing elements to thereby cause the movable magnetic field producing elements to move axially in one direction; and means connecting the movable valve element with said movable magnetic field producing element and through which said movable magnetic field producing element controls the position of the movable valve element.

19. In a valve, the combination of: a solenoid fixed with respect to the body of the valve; magnetically permeable frame means around said solenoid defining a magnetic circuit therefor closed adjacent to one end of the solenoid and having an axial opening adjacent to the opposite end of the solenoid, with the portions of the frame means adjacent to said opening defining a radial air gap coaxially of the solenoid and in which its field is concentrated; a movable solenoid disposed in said radial air gap so as to be inductively coupled with the fixed solenoid, and constrained to endwise back and forth motion coaxially of the fixed solenoid; means including a spring member for yieldingly supporting said movable solenoid in a predetermined axial position in said air gap out of which position the movable solenoid may be repelled by the induction of a current therein which produces a magnetic field about the movable solenoid acting in opposition to that portion of the air gap field farthest from the closed end of the magnetic circuit; means including portions of said magnetic frame means providing a fluid passageway in the valve, a portion of which extends axially through said movable solenoid; means in the valve for controlling the flow of fluid through said passageway, including a valve element movable back and forth toward and from a position precluding fluid flow through said passageway; and means connecting the valve element with the movable solenoid so that back and forth movement of said solenoid effects actuation of the valve element.

20. In a valve, the combination of: a solenoid fixed with respect to the body of the valve; magnetically permeable frame means around said solenoid having concentric radially spaced portions defining a radial air gap coaxially of said solenoid and in which its field is concentrated, said concentric portions of the frame means being magnetically connected with the opposite polar ends of the fixed solenoid so that the magnetic connection between one of said concentric portions and one polar end of the fixed solenoid closes the magnetic circuit adjacent to said polar end of the solenoid, while at said air gap adjacent to the opposite polar end of the solenoid the magnetic circuit is open; a movable solenoid disposed between said concentric portions of the frame means so as to be inductively coupled with the fixed solenoid, and constrained to endwise back and forth motion axially in said radial air gap; means including a spring member for yieldingly supporting said movable solenoid in a predetermined axial position in said air gap and from which position the movable solenoid may be repulsed away from the closed end of the magnetic circuit by the induction of a current in the movable solenoid producing a magnetic field thereabout acting in opposition to that portion of the air gap field farthest from the closed end of the magnetic circuit; means including said concentric portions of the frame means providing a fluid passageway a portion of which extends axially through said movable solenoid; means in the valve for controlling the flow of fluid through said passageway, including a valve element movable back and forth toward and from a position preventing fluid flow through said passageway; and means connecting the valve element with the movable solenoid so that back and forth movement of the solenoid effects actuation of the valve element.

21. In a valve, the combination of: a solenoid fixed with respect to the body of the valve; magnetically premeable frame means extending around the exterior and both ends of said fixed solenoid; other magnetically permeable means cooperating with said first designated frame means to provide a magnetic circuit extending substantially toroidally around the fixed solenoid, said other magnetically permeable means including a sleeve joined to the frame means adjacent to one end of the fixed solenoid and extending into said end thereof and terminating a substantial distance short of the opposite end of the fixed solenoid, and an inner duct having one end magnetically connected with the frame means at said opposite end of the fixed solenoid, the other end of the said inner duct extending coaxially into said sleeve and terminating within the same in radially spaced relationship thereto so that said radial space defines a radial air gap in the magnetic circuit provided by the frame means, the sleeve and the inner duct, said magnetic circuit being open at its end adjacent to the sleeve and closed at the opposite end and said inner duct and the sleeve cooperating to define a fluid passageway through the valve; a movable solenoid disposed in said radial air gap so as to be inductively coupled with the fixed solenoid, and constrained to endwise back and forth motion axially in said gap; means including a spring member for yieldingly holding said movable solenoid in a predetermined axial position in said air gap from which position the movable solenoid may be repelled axially in response to the induction of a current therein which produces a magnetic field about the movable solenoid acting in opposition to that portion of the air gap field farthest from the closed end of the magnetic circuit; means in the valve for controlling the flow of fluid through said passageway, including a valve element movable toward and from a position preventing the flow of fluid through said inner duct; and means connecting the valve element with said movable solenoid so that back and forth movement of the solenoid effects actuation of the valve element.

RUSSELL B. MATTHEWS.

References Cited in the file of this patent

UNITED STATES PATENTS

| Number | Name | Date |
|---|---|---|
| 363,186 | Thomson | May 17, 1887 |
| 1,066,081 | Coleman | July 1, 1913 |
| 1,531,007 | Jackson | Mar. 24, 1925 |
| 1,672,193 | Bason | June 5, 1928 |
| 1,980,736 | Trofimov | Nov. 13, 1934 |
| 1,986,158 | Payne | Jan. 1, 1935 |
| 2,125,910 | Gardner | Aug. 9, 1938 |
| 2,222,141 | Dension | Nov. 19, 1940 |
| 2,232,502 | Wittman | Feb. 18, 1941 |
| 2,263,819 | Ray | Nov. 25, 1941 |
| 2,292,477 | Ray | Aug. 11, 1942 |
| 2,294,693 | Ray | Sept. 1, 1942 |